(12) United States Patent
Neuharth et al.

(10) Patent No.: US 10,370,219 B2
(45) Date of Patent: Aug. 6, 2019

(54) DOCK MOUNTABLE FLOATATION MAT STORAGE ASSEMBLY

(71) Applicants: Shane Neuharth, Milford, IA (US); Scott Berglund, Milford, IA (US)

(72) Inventors: Shane Neuharth, Milford, IA (US); Scott Berglund, Milford, IA (US)

( * ) Notice: Subject to any disclaimer, the term of this patent is extended or adjusted under 35 U.S.C. 154(b) by 209 days.

(21) Appl. No.: 15/635,280

(22) Filed: Jun. 28, 2017

(65) Prior Publication Data
US 2019/0002233 A1   Jan. 3, 2019

(51) Int. Cl.
| F16M 13/00 | (2006.01) |
| B65H 75/44 | (2006.01) |
| F16M 13/02 | (2006.01) |
| B65H 18/08 | (2006.01) |
| E02B 3/06  | (2006.01) |

(52) U.S. Cl.
CPC ....... B65H 75/4494 (2013.01); B65H 18/085 (2013.01); F16M 13/02 (2013.01); E02B 3/068 (2013.01)

(58) Field of Classification Search
CPC .. B63B 7/00; B63B 7/08; B63B 35/74; B63B 35/76; B63B 6/00; B63C 9/30; A63B 6/02; A47C 27/081
USPC .............................. 405/218, 219; 248/306.01
See application file for complete search history.

(56) References Cited

U.S. PATENT DOCUMENTS

| 2,571,337 | A |   | 10/1951 | Burnham |   |
| 4,047,257 | A |   | 9/1977 | Bondarchuk, Sr. |   |
| 4,074,537 | A | * | 2/1978 | Gronlie | E02B 3/068 403/169 |
| 4,212,564 | A | * | 7/1980 | Kay | E02B 3/064 114/263 |
| 4,324,370 | A |   | 4/1982 | Guard |   |
| 4,349,297 | A | * | 9/1982 | Misener | E02B 3/068 405/221 |
| 4,467,978 | A |   | 8/1984 | Farrington |   |
| 4,968,278 | A | * | 11/1990 | Lemke | B63B 7/08 441/129 |
| 5,493,992 | A | * | 2/1996 | Johnson | B63C 1/02 114/263 |
| 5,557,811 | A |   | 9/1996 | Hoff |   |

(Continued)

FOREIGN PATENT DOCUMENTS

| CN | 203873435 | 10/2014 |
| CN | 205234021 | 5/2016 |

(Continued)

*Primary Examiner* — Steven M Marsh

(57) ABSTRACT

A dock mountable floatation mat storage assembly includes a first mount and a second mount each attached to dock. Each of the first and second mounts includes a base that has an inward portion, an outward portion and a central portion positioned between the inward and outward portions. The inward portion has an aperture extending therethrough. A riser has a top end and a bottom end. The bottom end is attached to the outward portion of the base and extends upwardly away therefrom. A fastener extends through the aperture and through the dock such that the fastener releasably secures the base to the dock. A spindle is positioned on and extends between the top ends of the first and second mounts. The spindle is rotatable relative to the first and second mounts and engages a floating mat such that the floating mat is rolled upon and storable on the spindle.

17 Claims, 6 Drawing Sheets

(56) References Cited

U.S. PATENT DOCUMENTS

| | | | |
|---|---|---|---|
| 9,803,381 B1* | 10/2017 | Bailie | E04F 11/1812 |
| 2017/0341719 A1* | 11/2017 | Bair | A47C 27/088 |
| 2018/0251334 A1* | 9/2018 | Behrendt | B65H 75/22 |

FOREIGN PATENT DOCUMENTS

| CN | 106136644 | 11/2016 |
|---|---|---|
| WO | WO1984004118 | 10/1984 |

* cited by examiner

DOCK MOUNTABLE FLOATATION MAT STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to floating mat storage devices and more particularly pertains to a new floating mat storage device for storing what are generally known as floating mats. Floating mats are large, substantially planar mats of flexible and buoyant material that are set afloat typically in small bodies of water such as lakes. Users of the floating mats lie on them and are thereby supported on the surface of the water. When not in use, the floating mats must be removed from the water and stored.

BRIEF SUMMARY OF THE INVENTION

An embodiment of the disclosure meets the needs presented above by generally comprising a first mount and a second mount. Each of the first and second mounts is attached to a bottom side of a dock. Each of the first and second mounts includes a base that is elongated and has an inward portion, an outward portion and a central portion positioned between the inward and outward portions. The inward portion has an aperture extending therethrough. A riser has a top end and a bottom end. The bottom end is attached to the outward portion of the base and extends upwardly away therefrom. A fastener extends through the aperture and through the dock such that the fastener releasably secures the base to the dock. A spindle is positioned on and extends between the top ends of the first and second mounts. The spindle is rotatable relative to the first and second mounts and engages a floating mat such that the floating mat is rolled upon and storable on the spindle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
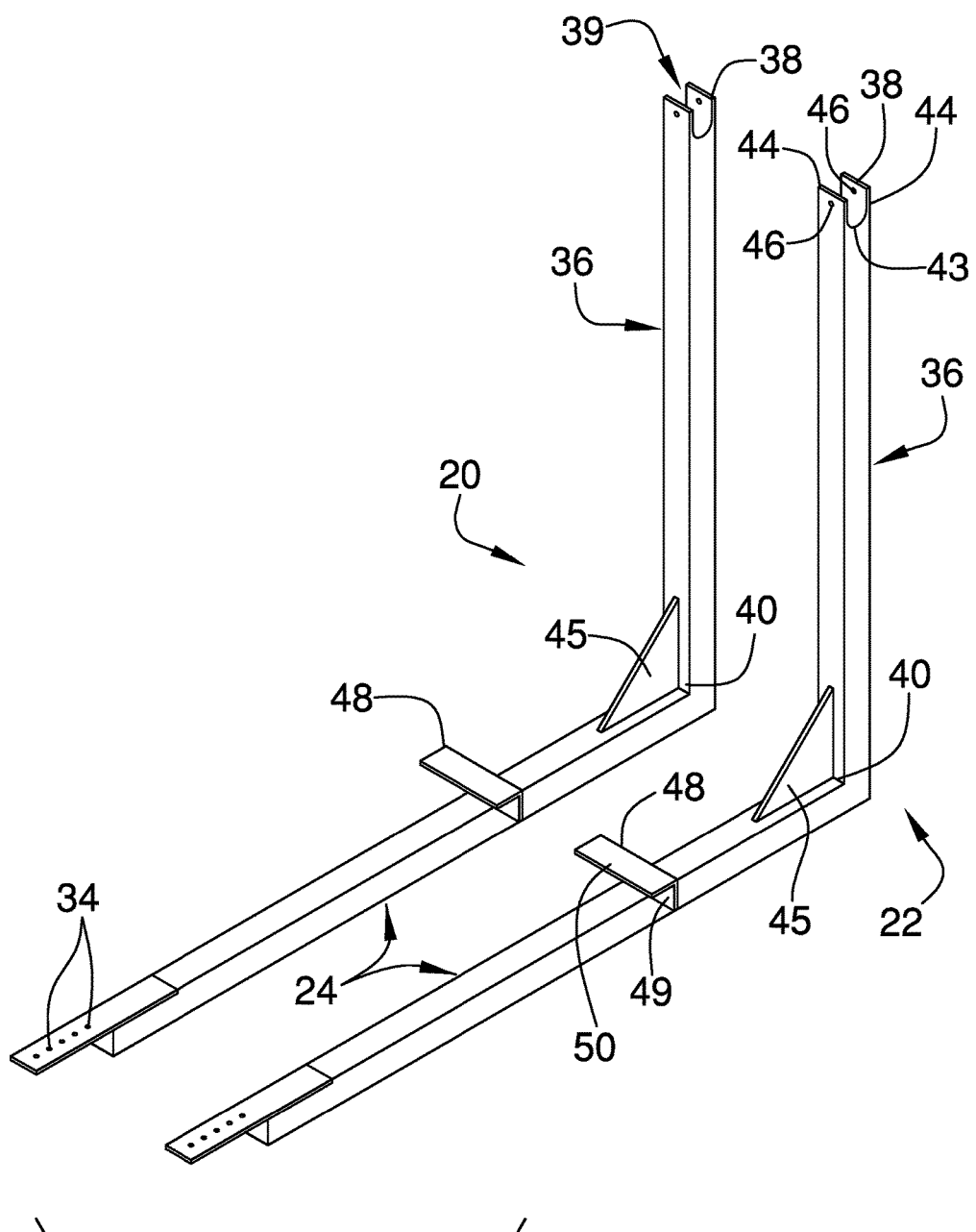
FIG. 1 is a front perspective view of a dock mountable floatation mat storage assembly according to an embodiment of the disclosure.
Figure 2:
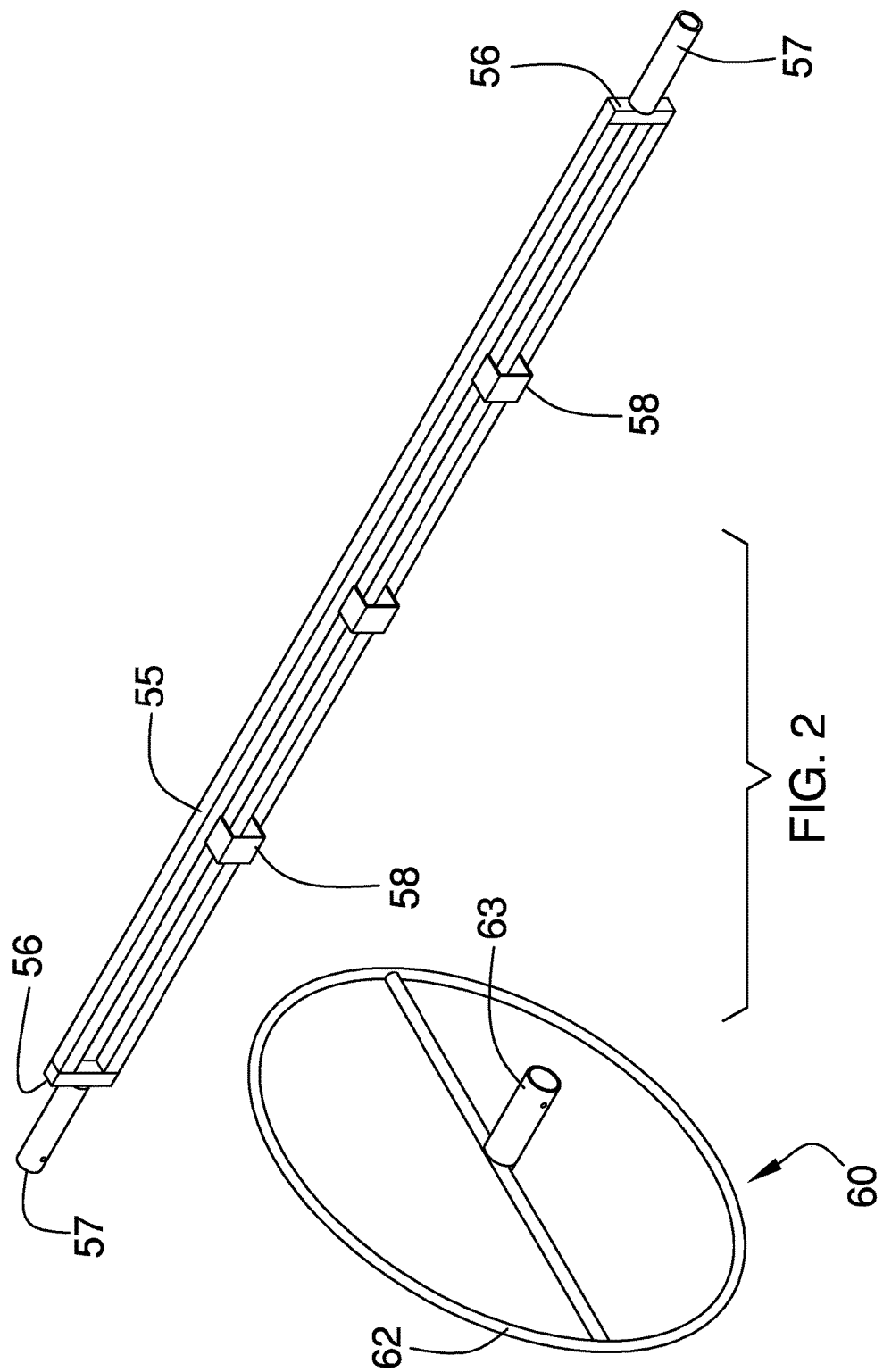
FIG. 2 is a perspective view of a spindle and crank of an embodiment of the disclosure.
Figure 3:
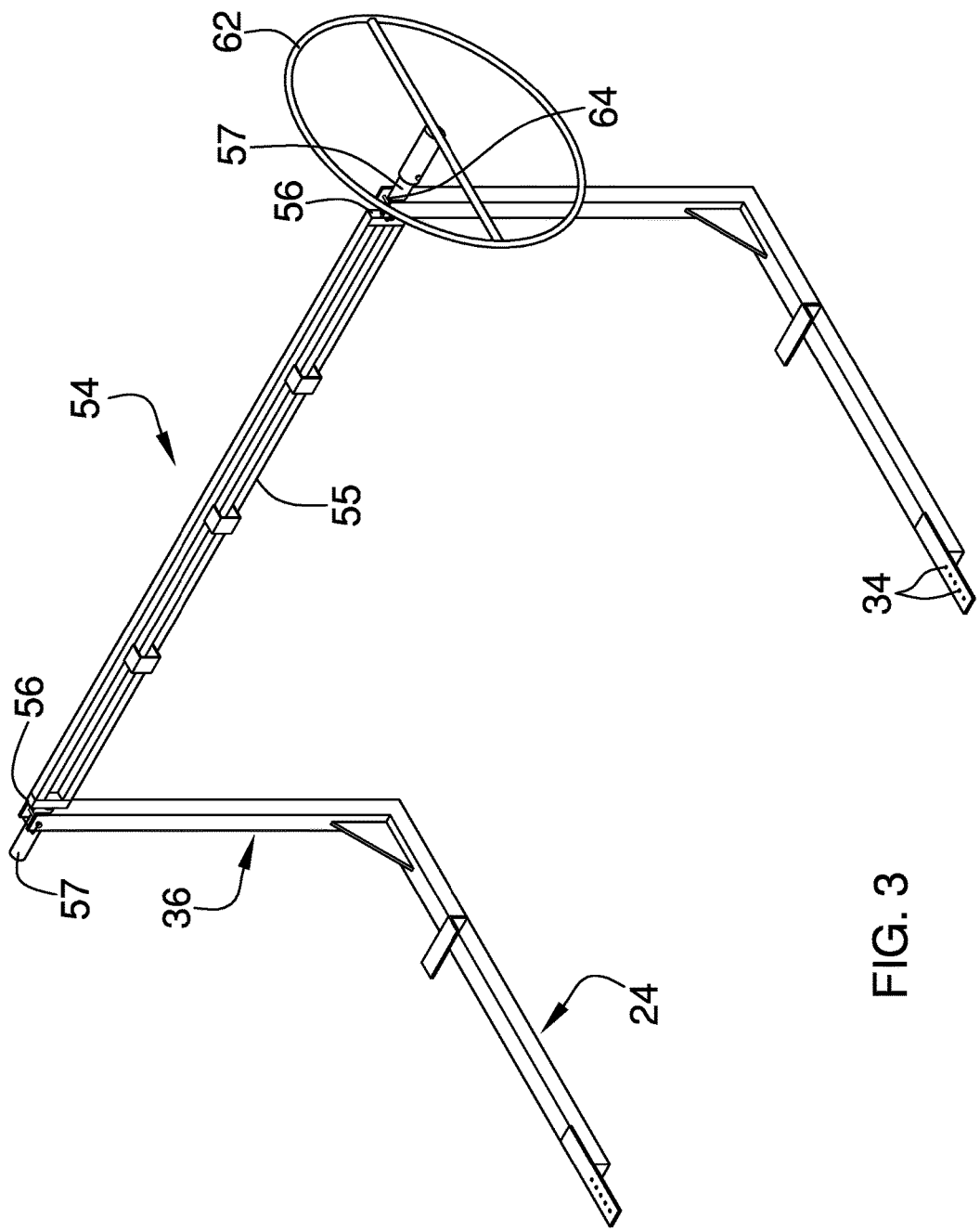
FIG. 3 is a perspective view of an embodiment of the disclosure.

With reference now to the drawings, and in particular to FIGS. 1 through 6 thereof, a new floating mat storage device embodying the principles and concepts of an embodiment of the disclosure and generally designated by the reference numeral 10 will be described.

As best illustrated in FIGS. 1 through 6, the dock mountable floatation mat storage assembly 10 generally comprises a first mount 20 and a second mount 22. Each of the first 20 and second 22 mounts is configured to be attached to a bottom side 16 of a conventional dock 14. The dock 14 is placed in a body of water 70, such as a lake, and typically includes a plurality of planks or panels secured together and positioned typically between 1.0 feet and 5.0 feet above the body of water.

Each of the first 20 and second 22 mounts includes a base 24 that elongated and has an inward portion 26, an outward portion 28 and a central portion 30 positioned between the inward 26 and outward 28 portions. The outward portion 28 includes an outward end 32, which is the furthest most laterally extending section of the base 24. The inward portion 28 has an aperture 34 extending therethrough. As can be seen in the Figures, the base 24 may substantially comprise a rectangular tube wherein the inward portion 26 further includes a plate attached to and extending away from the rectangular tube. The aperture 34 extends through the plate and the plate may have a plurality of apertures 34 extending therethrough. A riser 36 has a top end 38 and a bottom end 40. The bottom end 40 is attached to the outward portion 28 of the base 24 and extends upwardly away therefrom. The riser 36 is positioned adjacent to the outward end 32. The top end 38 forms a receiver 39, or saddle, that may include a middle section 43 and a pair of arms 44 extending upwardly from the middle section 43. The middle section 43 has a top side that is concavely arcuate. Each of the arms 44 has an opening 46 extending therethrough for reasons explained below. The base 24 may have a length between 48.0 inches and 96.0 inches and the riser may haves a height between 24.0 inches and 60.0 inches. Bracing 45 may be attached to and secure together the base 24 and riser 36

Figure 4:
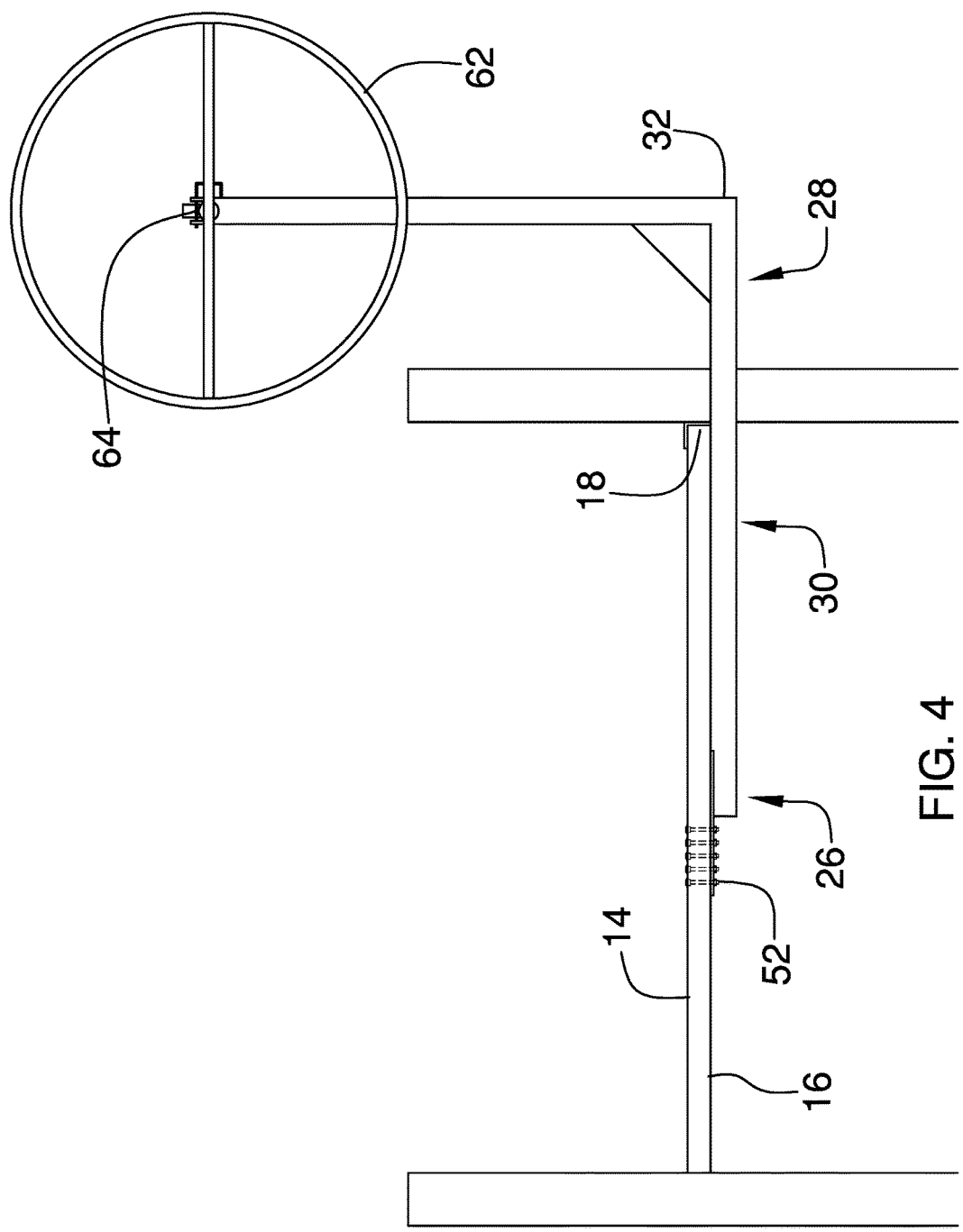
FIG. 4 is a side view of an embodiment of the disclosure.
Figure 5:
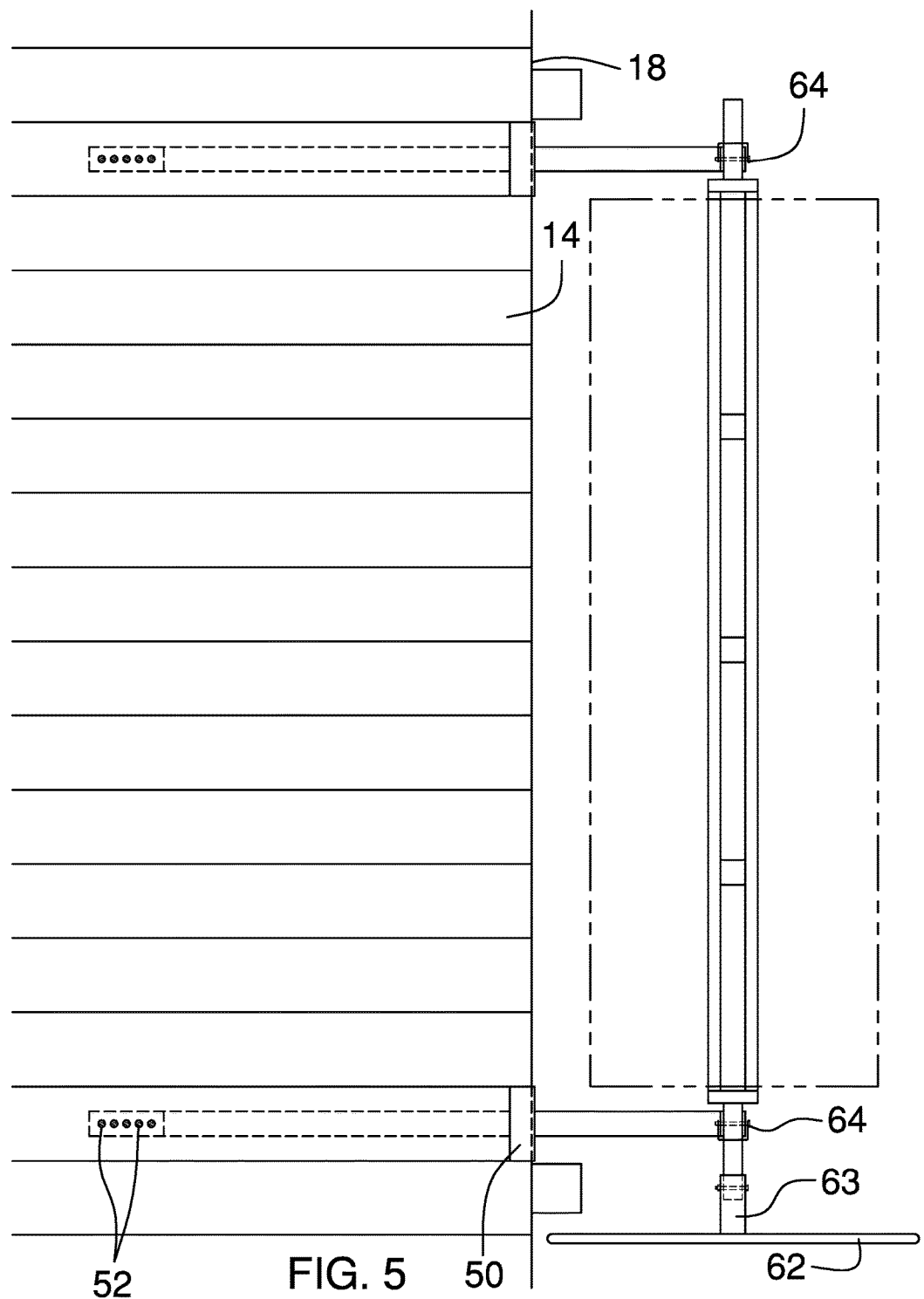
FIG. 5 is a top view of an embodiment of the disclosure.

Each of the first 20 and second 22 mounts further includes a bracket 48 that is attached to the central portion 30 and extends upwardly therefrom. The bracket 48 is configured to receive an edge 18 of the dock 14 when the base 24 is abutted against the bottom side 16 of the dock 14. The bracket 48 may include a vertical plate 49 attached to the base 24 and extending upwardly therefrom and a flange 50 being attached to the vertical plate 49 and positioned distal to the base 24. The flange 50 extends toward the inward portion 26 so that an engagement space is defined between the flange 50 and the base 24 for receiving and engaging the edge 18 of the dock 14. The brackets 48 help to stabilize and support an associated one of the first 20 and second 22 mounts relative to the dock 14. The brackets 48 are spaced between 30.0 and 50.0 inches from a free end of the inward portion 26. A fastener 52 extends through the aperture 34 and through the dock 14 such that the fastener 52 releasably secures the base 24 to the dock 14. As can be seen in FIG. 4, a plurality of fasteners 52, which may comprise bolts, may be extended through the dock 14 and through the apertures 34. The fasteners 52 prevent movement of the first 20 and second 22 mounts relative to the dock 18. When mounted to the dock 14, the first 20 and second 22 mounts may be spaced from each other a distance of between 60.0 inches and 100.00 inches, though the diameter of a floating mat 72 to be stored will determine the distance between the first 20 and second 22 mounts as will additional elements presented below.

Figure 6:
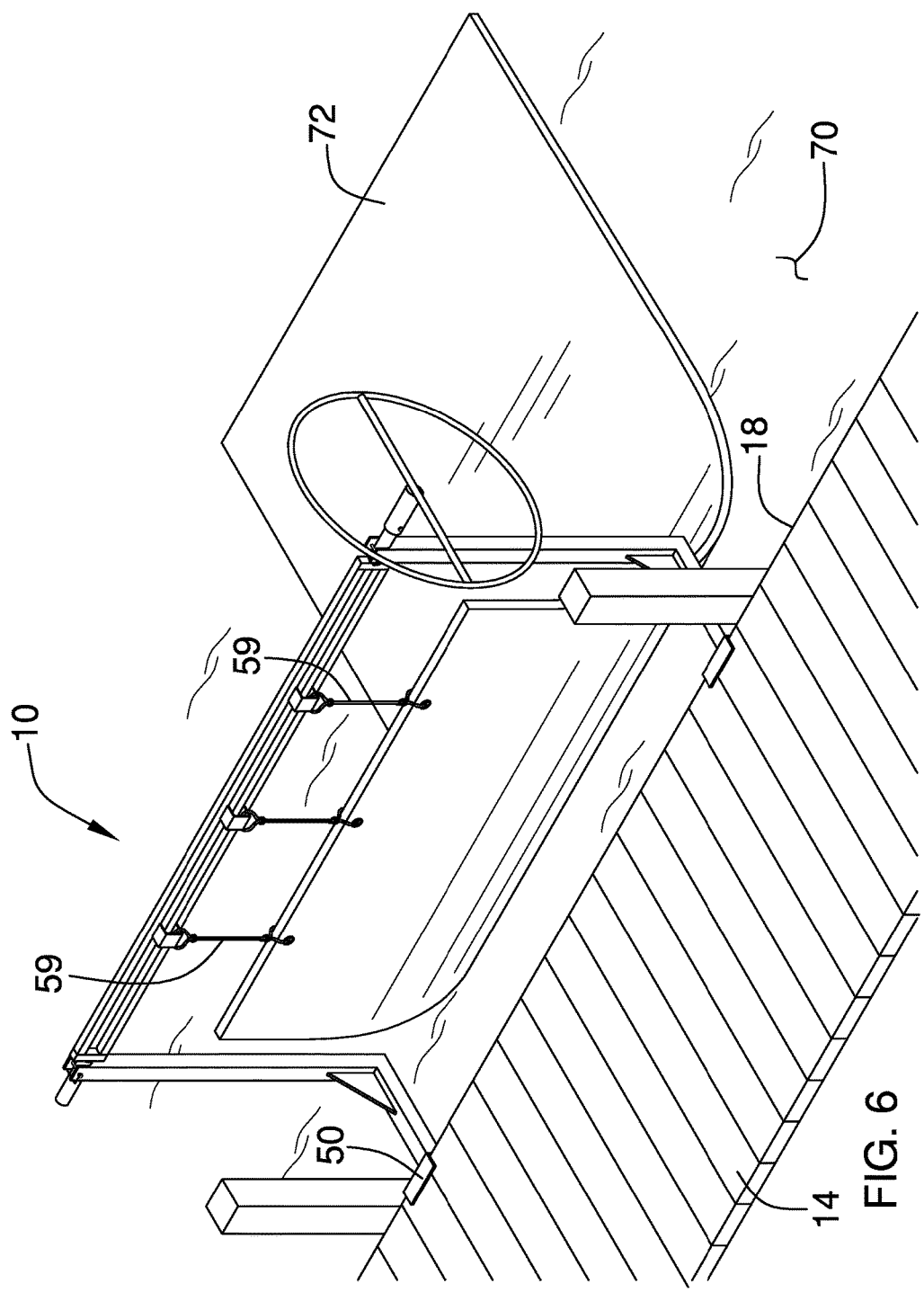
FIG. 6 is a perspective in-use view of an embodiment of the disclosure.

A spindle 54 is positioned on and extends between the top ends 38 of the first 20 and second 22 mounts. The spindle 54 is rotatable relative to the first 20 and second 22 mounts. The spindle 54 comprises a mat support 55 that is elongated and has a pair of opposed ends 56. A pair of rods 57 is provided and each of the opposed ends 56 has one of the rods 57 attached thereto. Each of the rods 57 is positioned in one of the receivers 39 of the first 20 and second 22 mounts. The mat support 55 has a greater width than the an opening through the receivers 39 such that the mat support 55 is laterally retained between the receivers 39, though shoulders positioned on the rods 57 either between the risers 36 or on the outside of the risers 36 may also be used to retain the spindle 54 on the risers 36. Each of the rods 57 has a cylindrical shape to facilitate rotation of the spindle 54 relative to the first 20 and second 22 mounts. A plurality of tie downs 58 is attached to the mat support 55. The tie downs 58 may include loops that to which tethers 59 are attached. The tethers 59 are then attached to a floating mat 72 as shown in FIG. 6. The tethers 59 may have any desired length and may be short, such as between 3.0 feet and 8.0 feet and only secured to the spindle during reeling of the floating mat 70 onto the spindle 54 or relatively long such as greater than 30 feet to be continuously attached to the spindle 54 to prevent the mat 72 from floating away from the dock 14. A crank 60 is attached to the spindle 54 and may include a wheel 62 having an axle 63 comprising a sleeve for receiving one of the rods 57. The wheel 62 may have a diameter between 24.0 inches and 48.0 inches. The spindle 54 may further be retained on the risers 36 with a pair of stops 64. Each of the receivers 39 has one of the stops 64 thereon to retain an associated one of the rods 57 in the receivers 39. The stops 64 may comprise pins extended through the aligned openings 46 in the arms 44.

In use, the assembly 10 is mounted on the dock 14 as described above and shown in the Figures. Because the bases 24 of the first 20 and second 22 mounts are positioned under the dock 18, there is no tripping hazard to those walking on the dock 18. The floating mat 72, when not being used, is wound onto the spindle 54 by tethering it to the spindle 54 and rotating the spindle 54 until the floating mat 72 is stored completely on the spindle 54. Once the floating mat 72 is rolled up, a strap (not shown) may be wrapped around the floating panel 72 to retain it in a rolled up condition until its next usage when the spindle 54 can be rotated in the opposite direction to unwind the floating mat 72 back into the water 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A flotation mat storage assembly configured to retrieve and store a floatation mat outwardly and above a body of water, said assembly comprising:

a first mount and a second mount, each of said first and second mounts being configured to be attached to a bottom side of a dock, each of said first and second mounts including:

a base being elongated and having an inward portion, an outward portion and a central portion positioned between said inward and outward portions, said inward portion having an aperture extending therethrough;

a riser having a top end and a bottom end, said bottom end being attached to said outward portion of said base and extending upwardly away therefrom;

a fastener extending through said aperture, said fastener being configured to be extended through the dock such that said fastener releasably secures said base to the dock;

a spindle being positioned on and extending between said top ends of said first and second mounts, said spindle being rotatable relative to said first and second mounts, said spindle being configured to engage a floating mat such that the floating mat is rolled upon and storable on said spindle.

2. The flotation mat storage assembly according to claim 1, wherein each of said top ends forms a receiver, said receiver including a middle section and a pair of arms extending upwardly from said middle section, said middle section having a top side being concavely arcuate, said spindle being positioned in said receiver of each of said top ends.

3. The flotation mat storage assembly according to claim 1, further including a bracket being attached to said central portion and extending upwardly therefrom, said bracket being configured to receive an edge of the dock when the base is abutted against the bottom side of the dock.

4. The flotation mat storage assembly according to claim 2, wherein said spindle comprises:
 a mat support being elongated and having a pair of opposed ends;
 a pair of rods, each of said opposed ends having one of said rods attached thereto, each of said rods being positioned in one of said receivers of said first and second mounts, said mat support having a greater width than said receivers such that said mat support is laterally retained between said receiver.

5. The flotation mat storage assembly according to claim 4, wherein each of said rods has a cylindrical shape.

6. The flotation mat storage assembly according to claim 1, further including a plurality of tie downs being attached to said spindle, said tie downs being configured to engage tethers attached to a floating mat.

7. The flotation mat storage assembly according to claim 1, further including a crank being attached to said spindle.

8. The flotation mat storage assembly according to claim 4, further including a pair of stops, each of said receivers having one of said stops thereon, said stops retaining an associated one of said rods in said receivers.

9. A flotation mat storage assembly configured to retrieve and store a floatation mat outwardly and above a body of water, said assembly comprising:
 a first mount and a second mount, each of said first and second mounts being configured to be attached to a bottom side of a dock, each of said first and second mounts including:
  a base being elongated and having an inward portion, an outward portion and a central portion positioned between said inward and outward portions, said outward portion including an outward end, said inward portion having an aperture extending therethrough;
  a riser having a top end and a bottom end, said bottom end being attached to said outward portion of said base and extending upwardly away therefrom, said riser being positioned adjacent to said outward end, said top end forming a receiver, said receiver including a middle section and a pair of arms extending upwardly from said middle section, said middle section having a top side being concavely arcuate;
  a bracket being attached to said central portion and extending upwardly therefrom, said bracket being configured to receive an edge of the dock when the base is abutted against the bottom side of the dock;
  a fastener extending through said aperture, said fastener being configured to be extended through the dock such that said fastener releasably secures said base to the dock;
 a spindle being positioned on and extending between said top ends of said first and second mounts, said spindle being rotatable relative to said first and second mounts, said spindle comprising:
  a mat support being elongated and having a pair of opposed ends;
  a pair of rods, each of said opposed ends having one of said rods attached thereto, each of said rods being positioned in one of said receivers of said first and second mounts, said mat support having a greater width than said receivers such that said mat support is laterally retained between said receiver, each of said rods having a cylindrical shape;
  a plurality of tie downs being attached to said mat support, said tie downs being configured to engage tethers attached to a floating mat;
 a crank being attached to said spindle; and
 a pair of stops, each of said receivers having one of said stops thereon, said stops retaining an associated one of said rods in said receivers.

10. A flotation mat storage system comprising:
 a dock having a bottom side and an edge, said dock being positioned in a body of water;
 a first mount and a second mount, each of said first and second mounts attached to said bottom side of said dock, each of said first and second mounts including:
  a base being elongated and having an inward portion, an outward portion and a central portion positioned between said inward and outward portions, said outward portion including an outward end, said inward portion having an aperture extending therethrough;
  a riser having a top end and a bottom end, said bottom end being attached to said outward portion of said base and extending upwardly away therefrom, said riser being positioned adjacent to said outward end;
  a fastener extending through said aperture and said dock to secures said base to said dock;
 a spindle being positioned on and extending between said top ends of said first and second mounts, said spindle being rotatable relative to said first and second mounts, said spindle being configured to engage a floating mat such that the floating mat is rolled upon and storable on said spindle.

11. The flotation mat storage assembly according to claim 10, wherein each of said top ends forms a receiver, said receiver including a middle section and a pair of arms extending upwardly from said middle section, said middle section having a top side being concavely arcuate, said spindle being positioned in said receiver of each of said top ends.

12. The flotation mat storage assembly according to claim 10, further including a bracket being attached to said central portion and extending upwardly therefrom, said bracket being configured to receive said edge of said dock when said base is abutted against said bottom side of said dock.

13. The flotation mat storage assembly according to claim 11, wherein said spindle comprises:
 a mat support being elongated and having a pair of opposed ends;
 a pair of rods, each of said opposed ends having one of said rods attached thereto, each of said rods being positioned in one of said receivers of said first and second mounts, said mat support having a greater width than said receivers such that said mat support is laterally retained between said receiver.

14. The flotation mat storage assembly according to claim 13, wherein each of said rods has a cylindrical shape.

15. The flotation mat storage assembly according to claim 10, further including a plurality of tie downs being attached to said spindle, said tie downs being configured to engage tethers attached to a floating mat.

16. The flotation mat storage assembly according to claim 10, further including a crank being attached to said spindle.

17. The flotation mat storage assembly according to claim 13, further including a pair of stops, each of said receivers having one of said stops thereon, said stops retaining an associated one of said rods in said receivers.

* * * * *